(12) United States Patent
Nakajima

(10) Patent No.: US 7,615,583 B2
(45) Date of Patent: Nov. 10, 2009

(54) RADIATION CURABLE INK AND PREPARATION METHOD AND IMAGE FORMING METHOD USING THE SAME

(75) Inventor: Atsushi Nakajima, Hachioji (JP)

(73) Assignee: Konica Corporation, Tokyo (JP)

( * ) Notice: Subject to any disclaimer, the term of this patent is extended or adjusted under 35 U.S.C. 154(b) by 600 days.

(21) Appl. No.: 11/371,786

(22) Filed: Mar. 9, 2006

(65) Prior Publication Data

US 2006/0160925 A1 Jul. 20, 2006

Related U.S. Application Data

(62) Division of application No. 10/405,831, filed on Apr. 2, 2003, now abandoned.

(30) Foreign Application Priority Data

Apr. 16, 2002 (JP) .............................. 2002-113164

(51) Int. Cl.
*C09D 11/00* (2006.01)

(52) U.S. Cl. ...................................... 523/160; 523/161
(58) Field of Classification Search ................. 523/160, 523/161

See application file for complete search history.

(56) References Cited

U.S. PATENT DOCUMENTS

2004/0145639 A1 * 7/2004 Noutary ....................... 347/100

* cited by examiner

*Primary Examiner*—Edward J Cain
(74) *Attorney, Agent, or Firm*—Lucas & Mercanti, LLP

(57) ABSTRACT

A radiation-curable ink including, (a) a colorant dispersion containing a pigment and a diluent, the pigment being present in an amount of 20 to 95 weight % based on the total weight of the colorant dispersion; (b) polymerizable compound; and (c) a polymerization initiator, wherein the radiation-curable ink has a viscosity of 6 to 500 mPa·s measured at 25° C. and comprises water in an amount of not more than 2.5 weight % based on the total weight of the radiation-curable ink measured with Karl Fisher method.

7 Claims, No Drawings

RADIATION CURABLE INK AND PREPARATION METHOD AND IMAGE FORMING METHOD USING THE SAME

CROSS REFERENCE TO RELATED APPLICATIONS

This Application is a Divisional of U.S. patent application Ser. No. 10/405,831, filed Apr. 2, 2003, now abandoned, which, in turn, claimed the priority of Japanese Patent Application No. 2002-113164, filed Apr. 16, 2002. The priority of both Applications is hereby claimed and both Applications are incorporated herein by reference.

FIELD OF THE INVENTION

The present invention relates to an actinic radiation curable ink (or simply called a radiation curable ink) which is reactive and curable upon actinic radiation such as visible light, ultraviolet radiation, infrared radiation, γ-rays and electron beams, and its preparation method with an image forming method using thereof, and particularly relates to an image forming method employing ultraviolet curable flexographic ink and an image forming method employing ultraviolet curable ink-jet ink, the ink of which requires physical ink properties having excellent dispersibility of pigments and low viscosity.

BACKGROUND OF THE INVENTION

Ultraviolet curable ink is widely employed in the field of offset printing, gravure printing, screen printing, relief printing and ink-jet printing, due to quick drying, excellent ecological suitability due to an absence of volatile solvents, and the capability of printing onto various base materials.

In recent years, flexographic printing has been the focus in technical improvement of high image quality and suitability for short printing runs, compared to gravure printing and offset printing. Ink-jet printing has also been the focus in capability of on-demand printing and employing ultraviolet ink (hereinafter, referred to as also UV ink) thereby has resulted in not requiring a special medium for printing.

In order to apply non-solvent UV ink to flexographic-graphic printing or ink-jet printing, lowered ink viscosity is an essential requirement. Specifically in ink-jet printing, there is a problem in selecting inks having a viscosity at ejection from 2-30 mPa·s, and preferably from 3-20 mPa·s, even when using a piezo type head having relatively wide flexibility for various inks.

Further, in ink-jet printing, using pigments as coloring agents is preferred from the viewpoint of actinic radiation curability and image durability, however, problems of clogged nozzles occur in cases when the pigment particle size is more than 1 μm.

Examples of non-solvent UV curable inks are disclosed in JP-A Nos. 5-214279, 5-214280 (hereinafter, the term JP-A means Japanese Patent Application Publication), Toku Hyo 2000-505778 (Toku Hyo: Kohyo Tokkyo Koho=International Patent Application Publication; hereinafter, referred to as JP-C), WO 99/29787, WO 99/29788 (hereinafter, the term WO means International Patent Publication). A method to dilute the curable ink with polymerizing monomers after dispersion of pigments in conjunction with a dispersing agent to prepare a pigment mill base to heighten the pigment dispersibility, is disclosed in WO 99/29787 and WO 99/29788. On the other hand, solid colored compounds for water based ink-jet ink and preparation methods for the same are disclosed in JP-A 2002-12810.

As mentioned above, to obtain excellent colorant dispersion it is effective that blending and dispersion is conducted in a state of high pigment ratio, on the condition that pigments and a dispersing agent are mixed beforehand.

In these methods, however, if a resin for colorant dispersion is selected considering only dispersibility, there is a problem of impaired printing suitability due to deterioration of ink storage stability, lowered curing sensitivity and deterioration of ejection stability due to an increase in ink viscosity caused by resin components.

Further, if a low viscosity polymerizable compound is employed as a dispersion medium, there may be problems in that polymerization proceeds when dispersion is conducted to obtain sufficient dispersibility.

SUMMARY OF THE INVENTION

It is an object to provide actinic radiation curable ink (hereinafter, also referred to merely as ink) exhibiting low viscosity and superiority to sensitivity, ejection stability, heat cycle ability and ink storage stability, and the preparation method and an image forming method using the same as is the case for actinic radiation curable ink used for printing methods such as UV curable flexographic printing and UV curable ink-jet printing requiring low viscosity actinic radiation curable ink, and a preparation method for the same.

The above object of the present invention can be realized by the following embodiments.

1. According to one embodiment of the present invention, a radiation-curable ink is provided, the ink comprising:
   (a) a colorant dispersion containing a pigment and a diluent, the pigment being present in an amount of 20 to 95 weight % based on the total weight of the colorant dispersion;
   (b) a polymerizable compound; and
   (c) a polymerization initiator,
   wherein the radiation-curable ink has a viscosity of 6 to 500 mPa·s measured at 25° C. and comprises water in an amount of not more than 2.5 weight % based on the total weight of the radiation-curable ink measured with Karl Fisher method.
2. In another embodiment the radiation-curable ink of item 1 is provided, wherein the ink may comprise water in an amount of not more than 1.5 weight % based on the total weight of the radiation-curable ink measured with Karl Fisher method.
3. In another embodiment the radiation-curable ink of item 1 is provided, wherein the ink may further comprises a polymerization inhibitor capable of preventing the polymerizable compound from photo-polymerizing or thermo-polymerizing.
4. In another embodiment the radiation-curable ink of item 1 is provided, wherein an acid value of each of the diluent, the polymerizable compound and the polymerization initiator may be at most 10.
5. In another embodiment the radiation-curable ink of item 1 is provided, wherein the ink may further comprises an amino compound which acts as a polymerization accelerator.
6. In another embodiment the radiation-curable ink of item 3 is provided, wherein the polymerization inhibitor may be contained in the colorant dispersion.
7. In another embodiment a method for producing a radiation-curable ink is provided, wherein the method may comprises the steps of:
   (a) adding a pigment to a diluent containing at least one component selected from the group consisting of a resin, a dispersant and a first polymerizable compound in a vessel to obtain a pigment mixture, a weight ratio of the pigment being 20 to 95 weight % based on the total weight of the pigment mixture and a weight ratio of the diluent containing at least one component selected from the group consisting of a resin, a dispersant and a first polymerizable compound being 5 to 85 weight % based on the total weight of the pigment mixture;

(b) dispersing the pigment mixture to obtain a colorant dispersion;

(c) adding a second polymerizable compound and a polymerization initiator to the colorant dispersion to obtain a radiation-curable ink precursor, provided that the first polymerizable compound and the second polymerizable compound may be the same or different with each other;

(d) adjusting a content of water in the radiation-curable ink precursor to be not more than 2.5 weight % based on the total weight of the radiation-curable ink precursor; and (e) dispersing the radiation-curable ink precursor to obtain a radiation-curable ink having a viscosity of 6 to 500 mPa·s measured at 25° C.

8. In another embodiment the method for producing a radiation-curable ink of item 7 is provided, wherein the diluent used in the step (a) may comprises a polymerizable monomer or a polymerizable oligomer.

9. In another embodiment the method for producing a radiation-curable ink of item 7 is provided, wherein a polymerization inhibitor may be further added in the step (a).

10. In another embodiment the method for producing a radiation-curable ink of item 9 is provided, wherein the polymerization inhibitor may be a phenol derivative comprising a carbon-carbon double bond derived from an acrylic acid.

11. In another embodiment the method for producing a radiation-curable ink of item 7 is provided, wherein the step (d) may be carried out by applying heat to the radiation-curable ink precursor or by subjecting the radiation-curable ink precursor under a reduced pressure so as to reduce water.

12. In another embodiment a method for forming a cured image is provided, wherein the method may comprises the steps of:

(a) jetting droplets of the radiation-curable ink of claim 1 on an ink-jet printing sheet with an ink-jet printer so as to form an image; and (c) irradiating an actinic ray on a surface of the ink-jet sheet to such an extent that the image formed with the radiation-curable ink is cured to form the cured image.

The inventor of the present invention has diligently studied the foregoing problems, resulting in the discovery that it is important to use color chips or color paste of a high pigment ratio in the dispersion process of pigments as a coloring material. In the production of the color chips or color paste, it is important to select a resin capable of restraining viscosity increase when dissolved in a polymerizable compound, or to lower the resin content, or to employ a polymerizable compound to be finally necessary as a resin. In cases when a polymerizable compound is used for blending, a polymerization inhibitor is added since polymerization is accelerated by actinic radiation or heat depending on blending conditions. Further, the inventor discovered that it is also important to eliminate a high acid value compound to obtain better storage stability and printability such as ink ejection property. It is also important to control the moisture content of ink within a certain range by employing reduced pressure.

An actinic radiation curable ink of the present invention contains (a) a colorant dispersion containing pigments of 20-95 weight %, (b) a polymerizable compound and (c) a polymerization initiator, wherein the actinic radiation curable ink exhibits a viscosity of 6-500 mPa·s at 25° C., and a moisture content of 0.01-2.5 weight % measured by the Karl Fischer method.

A preparation method of actinic radiation curable ink of the present invention comprising the steps of:

(1) preparing a colorant dispersion after mixing and blending of pigment (a) of 20-95 weight % and at least one other additive selected from a resin, a dispersing agent or a polymerizable compound of 5-80 weight %;

(2) mixing of polymerizable compound (b) and polymerization initiator (c);

(3) adjusting the viscosity from 6-500 mPa·s at 25° C., and moisture content from 0.01-2.5 weight % employing the Karl Fischer method.

DETAILED DESCRIPTION OF THE INVENTION

The embodiments of the present invention will now be described in detail.

Preparation Method of Colorant dispersion

A colorant dispersion of this invention comprises mainly a coloring material composed of pigments and a medium capable of dispersing the coloring material, or a term "diluent" is also used to designate this medium. A small diameter of pigment particles can be achieved by dispersion with a high shearing force in conditions of a coloring material being 20-95 weight %. The medium used in this invention can be appropriately selected from resins, dispersing agents and polymerizable compounds. Other than these, usual solvents may be employed, however, in cases where non-solvent types are desired for a finally prepared ink, it is preferable to provide a solvent eliminating process.

Pigments preferably used in this invention will be described below. Used can be pigments which have not been up to now used in practice for ink-jet ink because the color formation ability (color density per added amount) has not always been high enough, and in addition, has tended to exhibit excessively increased melt viscosity at high concentration due to difficulty in production of a uniform fine particle dispersion. The kinds of pigments are not specifically restricted, however, and examples of usable pigments in this invention include the following organic or inorganic pigments described in the Color Index.

The following pigments may appropriately be employed for these purposes, as red or magenta pigment: Pigment Red 3, 5, 19, 22, 31, 38, 43, 48: 1, 48: 2, 48: 3, 48: 4, 48: 5, 49: 1, 53: 1, 57: 1, 57: 2, 58: 4, 63: 1, 81, 81: 1, 81: 2, 81: 3, 81: 4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, and 88; as blue or cyan pigment: Pigment Blue 1, 15, 15: 1, 15: 2, 15: 3, 15: 4, 15: 6, 16, 17-1, 22, 27, 28, 29, 36, and 60; as green pigment: Pigment green 7, 26, 36, and 50; as yellow pigment: Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193; as black pigment: Pigment Black 7, 28, and 26; as white pigment: Pigment White 6, 18, and 21.

While carbon black is usually used as a coloring material in black ink, it exhibits high ultraviolet absorption, resulting in problems of rather low sensitivity in UV curable methods. Therefore, the black ink which reproduces black images by using plural color pigments other than titanium black or carbon black, exhibits good UV transparency. Thus, the black ink works quite effectively in ink-jet printing to improve interior hardening in shadow areas where a large amount of ink is specifically ejected in one spot with plural colors. Further, it also works effectively in bi-directional printing.

The ratio of coloring material in a colorant dispersion is normally 20-95 weight %, and is desirably as high as possible. The ratio is preferably 30-95 weight %, and more preferably 50-95 weight %.

The average particle size of pigment particles is preferably 0.08-0.5 μm, and pigments, a dispersing agent, selection of a dispersion medium, dispersing conditions and filtration conditions are selected to obtain the maximum particle size of 0.3-10.0 μm, and preferably 0.3-3.0 μm. By this particle size control, clogging of head nozzle can be inhibited, and ink storage stability, ink transparency and ink curing sensitivity can be maintained.

Resins usable in this invention are not specifically restricted, but the following resins are effective, such as, petroleum type resins (e.g., styrene type, acryl type, polyester, polyurethane type, phenol type, butyral type, cellulose type, and rosin); and thermoplastic resins (e.g., vinyl chloride vinyl acetate type). Commonly used resins may be employed depending on the type of printing material and function thereof.

In order to lower the final ink viscosity, the viscosity is preferably controlled to be as low as possible when a colorant dispersion is dissolved in a polymerizable compound. Since resin is contained in ink based on the component of colorant dispersion used in the ink, the resin component and the resin content in a colorant dispersion are preferably controlled to have a viscosity of resin dissolved in a polymerizable compound of less than 500 mPa·s, preferably less than 200 mPa·s, and more preferably less than 50 mPa·s.

The actinic radiation curable ink of this invention preferably contains a compound having an acid value of at most 10. If a high acid value compound is contained in ink, ink storage stability deteriorates to result in undesirable characteristics. Therefore, the foregoing resin is preferably selected from low acid value compounds. Specifically, in cases when amines, used to prevent polymerization inhibition caused by oxygen, or used for polymerization acceleration, are employed in radical polymerization system, the amines react to high acid value compounds, resulting in a factor to cause storage stability deterioration. In UV ink-jet methods, the method of ink heating to about 40-80° C. is employed to achieve lowered ink viscosity and higher ink ejecting stability. In this case, if a high acid value compound is present, ink storage stability is excessively deteriorated. The acid value of a compound contained in ink is preferably less than 10, preferably less than 5, and more preferably less than 1.

In cases when a polymerizable compound is used as a colorant dispersion medium of this invention, any polymerizable compound commonly known in the art may be employed. Any method of usual radical polymerization, photo-curing system using photo acid or photo base generator, or photo induction alternating copolymerization may be employed. These photo-curing systems are described in detail in Hikarikokagijutsu-Jushi.Kaishizai no Senntei to Haigojoken oyobi Kokado no Sokutei.Hyoka, (Photo-curing Technology: Selection of Resins and Initiators; and Measurement and Evaluation of Blending Condition and Degree of Curing), published by Gijutsujoho Kyokai.

In general, radical polymerization and cationic polymerization are employed widely, and in addition photo induction alternating copolymerization needing no initiator may also be employed. Further, a hybrid system of combinations of these systems is also effective.

Usual cationic polymerization is superior in effectiveness due to lack of inhibition of polymerization by oxygen, however its reaction rate is low and its cost is high. In case of cationic polymerization, it is preferable to combine an epoxy compound and an oxetane compound to raise the reaction rate.

Since radical polymerization is the most widely employed process, preferable embodiments of the radical polymerization will be described below.

Various acrylate monomers may be employed as polymerizing monomers, such as mono-functional monomers of isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyxyethylphthalic acid, 2-acryloyxyethyl-2-hydroxyethylphthalic acid, lactone modified flexible acrylate, and t-butylcyclohexyl acrylate; bi-functional monomers of triethylene glycol diacrylate, tetraethylene glycol diacrylate, polyethylene glycol diacrylate, tripropylene glycol diacrylate, polypropylene glycol diacrylate, 1,4butanediol diacrylate, 1,6hexanediol diacrylate, 1,9nonanediol diacrylate, neopentyl glycol diacrylate, dimethylol-tricyclodecane diacrylate, bisphenol A EO (ethylene oxide) adduct diacrylate, bisphenol A PO (propylene oxide) adduct di-acrylate, hydroxypivalate neopentyl glycol diacrylate, and polytetramethylene glycol diacrylate; poly-functional monomers of more than tri-functional of trimethylolpropane triacrylate, EO modified trimethylolpropane triacrylate, pentaerythritol triacrylate, pentaerithritol tetraacrylate, dipentaerythritol hexaacrylate, ditrimethylolpropane tetraacrylate, glycerinpropoxy triacrylate, caprolactone modified trimethylolpropane triacrylate, pentaerythritolethoxy tetraacrylate, and caorolactam modified dipentaerythritol hexaacrylate.

Other than these, polymerizable oligomers can be blended in the same manner as monomers. Examples of these polymerizable oligomers include epoxy acrylates, aliphatic urethane acrylates, aromatic urethane acrylates, polyester acrylates, and straight-chained acrylic oligomers.

Further, methacrylates of the foregoing acrylates may be used with these acrylates. Of the methacrylates, methoxypolyethylene glycol methacrylate, methoxytriethylene glycol methacrylate, phenoxyethyl methacrylate, cyclohexyl methacrylate, tetraethylene glycol dimethacrylate, and polyethylene glycol dimethacrylate are preferable due to relatively high sensitivity and improved adhesion to a base material.

In cases when these radical polymerizing monomers are used, it is preferable that the dissolution viscosity of the polymerizable compound added to ink is low, and it is also preferable that the acid value is low, being at least at the same level as the foregoing resins.

In addition, commonly known dispersing agents, surface active agents and solvents may be employed in preparation of a colorant dispersion. Generally, polymerizing monomers are high polarity compounds and exhibit a high SP value, and thus, resins, dispersing agents and solvents having relatively high polarity are preferably combined. Concrete examples of these are resins such as acrylate copolymers, styrene-acrylate copolymers, butyral resins acetalized and partially saponified polyvinyl alcohol, and vinylacetate copolymers; as well as nonionic dispersing agents and surface active agents.

In cases where the colorant dispersion medium is a polymerizable compound, a lower reactivity compound is preferable used among the polymerizable compounds finally blended in the ink. For example, a mono-functional acrylate is used as a dispersion medium of a colorant dispersion, when a mono-functional acrylate and a tri-functional acrylate are finally blended in the ink. In the blending process of a colorant dispersion containing pigments in high concentration, the viscosity is preferably targeted high enough for enhanced dispersibility to result in high shear. However, thermal polymerization may occur due to locally generated heat when high shear is provided, resulting in a problem of gelling during dispersion. Therefore, dispersion is often performed using a lower reactive polymerizable compound.

Regarding to lower the ink viscosity, a colorant dispersion is preferably prepared employing a polymerizable compound which is an essential component of the ink. Thus, it is important to prevent undesirable polymerization and the resulting deterioration which is caused by thermo-polymerization with dispersion shear and light absorption during handling of the dispersion.

In this invention, it is preferred to add a polymerization inhibitor to restrain polymerization by heat or actinic radiation in ink. The specifically preferable preparation method is to add an inhibitor during preparation of the colorant dispersion. Various compounds are known as polymerization inhibitors, and these compounds may be employed without modification which are commonly employed with components of typical polymerizable compounds.

Examples of polymerization inhibitors include phenol type antioxidants, hindered-amine light stabilizers, phosper type antioxidants, hydroquinonemonomethyl ether commonly used in (metha)acrylate monomers, and in addition to these, hydroquinone, t-butylcatechol, pyrogallol may be used. These inhibitors are detailed in Kobunshi Tenkazai no Kaihatsu Gijutsu (Developing Technology of Polymer Additives), published by CMC Publication Co. Of these, a phenol compound having a double bond in molecules derived from acrylic acid is specifically preferable due to featuring a polymerization restraining effect even when heated in a closed, oxygen free environment based on reaction mechanisms capable of trapping R. (a radical group). Exemplarily listed are Sumilizer GA-80, Sumilizer GM and Sumilizer GS produced by Sumitomo Chemical Co., Ltd.

Since excessive addition of these polymerization inhibitors is one of the factors to lower the ink sensitivity, it is preferred that the amount capable of preventing polymerization during colorant dispersion is appropriately determined prior to blending. However, it is also preferred that an excessive amount of polymerization inhibitor is added and that the amount is reduced by extraction after dispersion. The amount of a polymerization inhibitor in ink is preferably 200-20,000 ppm.

A colorant dispersion of this invention can be prepared by mixing, milling and dispersion of a color material and a dispersion medium. Mixing apparatuses include a pressure kneader, an open kneader, a planetary mixer, a pony mixer, a dissolver, and a Dalton Universal Mixer. Listed as apparatuses for milling and dispersion are a colloid mill, a high speed disperser, double rollers, a bead mill, a paint conditioner, and triple rollers. Of these, a dispersion method with a double roller mill is specifically preferable from the dispersibility point of view due to possibility of providing high shear. In this case, it is preferable that the ratio and kinds of pigments and a dispersion medium is determined beforehand to assure a viscosity of the colorant dispersion of at least $10^3$ mPa·s, and preferably at least $10^6$ mPa·s.

In the process of mixing, milling and dispersion, each process is performed under cooling so as to prevent build up of heat, and as much as possible under light shielding conditions.

Preparation Method of Actinic Radiation Curable Ink

Ink of this invention is prepared by means of mixing or dispersion after addition of the forgoing colorant dispersion and polymerizable compound, and other additives as appropriate.

As a polymerizable compound, any compound listed in the paragraphs describing colorant dispersion may be employed without modification. A mono-functional monomer is preferably contained at 5-40 weight % of the total ink, and a bi-functional monomer is preferably 5-70 weight %, while a poly-functional monomer is preferably 5-30 weight %. It is preferable that a highly reactive, bi-functional or poly-functional of more than a tri-functional compound is added during the ink preparation process.

The difference between the maximum and the minimum value of the Solubility Parameter (an SP value) exhibited by simultaneously used monomers is preferably at least 1, to obtain adequate adhesion to various base materials. More preferably it is at least 1.5, however, the upper limit is not more than 2.5.

Initiators usable in this invention include commonly known initiators such as arylalkylketones, oxime ketones, acylphophine oxides, acylphosphonates, thiobenzoate s-phenyl, titanocene, aromatic ketones, thioxanthone, benzyl and quinone derivatives, and ketocoumarines. Of these, acylphosphine oxides and acylphophonates are specifically effective for interior hardening of ink images having a thickness of 5-15 μm per color of ink-jet printed images due to high sensitivity and absorption decrease by radiation cleavage of the initiator. Concretely, preferred are bis (2,4,6-trimethyl-benzoyl)-phenylphosphine oxide, and bis (2,6-dimethoxy-benzoyl)-2,4,4-trimethyl-pentylphophine oxide.

For selection in consideration of high sensitivity, safety of production and odor, the following are preferably used, such as 1-hydroxy-cyclohexyl-phenyl-ketone, 2-methyl-1[4-(methylthio)phenyl]-2-morpholinopropane-1-on, 2-hydroxy-2-methyl-1-phenyl-propane-1-on, and 2-benzyl-2-dimethylamino-1-(morpholinophenyl)-butane-1.

Combinations regarding oxygen polymerization inhibition and sensitivity, the following are effective, such as a combination of 2-benzyl-2-dimethylamino-1-(4-morpholinophenyl)-butane-1 and 1-hydroxy-cyclohexyl-phenyl-ketone; 1-hydroxy-cyclohexyl-phenyl-ketone and benzophenone; 2-methyl-1[4-(methylthio)phenyl]-2-morpholinopropane-1-on or 2-methyl-1[4-(methylthio)phenyl]-2-morpholinopropane-1-on and diethyltuioxanthone or isopropylthioxanthone; and benzophenone and acrylate derivatives having a tertiary amino group, and addition of tertiary amines. An amine compound is commonly employed to decrease an oxygen polymerization inhibition or to increase sensitivity. However, when an amine compound is used in combination with a high acid value compound, the storage stability at high temperature tends to be decreased. Therefore, specifically, the use of an amine compound with a high acid value compound in ink-jet printing should be avoided.

A preferable added amount of the initiators is 1-10 weight % of the total ink weight, and preferably 1-6 weight %. In this invention, irradiation of actinic radiation is preferably divided into two steps for changing wavelength or intensity, and specifically preferable is that more than 2 kinds of initiators are used together.

In addition to these, surface active agents, levering additives, matting agents, adjusting agents for physical film properties such as polyester resins, polyurethane resins, vinyl resins, acryl resins, gum resins and waxes, may be added based on desired function. As a surface active agent, a fluorinated or silicone compound may be used, however, a potential drawback is bleed-out after image formation because an active agent itself does not cross link. In this case, it is preferable to use a copolymerizable monomer having surface active effects, for example, such monomers are silicone modified acrylate, silicone modified methacrylate, fluorinated acrylate, and fluorinated methaacrylate. Concrete examples are described in WO 99/29787 and 99/29788.

Further, it is effective to add an extremely small amount of an organic solvent to improve adhesion to a base material (referred to also as a recording medium) after UV curing. In this case, the added solvent can be an amount in the range to not cause problems of solvent resistance and VOC, but it is preferred to use as little as practical. If needed, the added amount is preferably 0.1-5.0%, and more preferably 0.1-3.0%.

As a prevention means of sensitivity decrease based on the light shielding effect by a coloring material in the ink, it is possible to make radical.cationic hybrid type curable ink with a combination of a cationic polymerization monomer having a long life duration initiator and polymerization initiator.

Ink of this invention preferably has a viscosity of 6-500 mPa·s at 25° C. and a surface tension of 20-35 dyn/cm so that the ink dots level out to a moderate degree on a base material after contact, and also achieve adhesion. Further, temperature control by heating to posses ink viscosity of 6-20 mPa·s at ink ejection is preferred from the view point of ink-jet recording.

In general, ink may absorb moisture by contact with ambient air in dispersion and other processes during ink preparation. Specifically, dispersion conditions when enhanced as in this invention, making moisture absorption in this dispersion process inevitable, and then, it becomes obvious that various deterioration of properties are caused in such situations.

That is, in cases where the moisture content of ink is high, several problems are caused, such as deterioration of adhesiveness to the base material, deterioration of durability of formed images especially water resistance, deteriorated stability of ink due to long term storage, and ink storage stability especially, while in the nozzle.

In this invention, one of the features is to have a moisture content of not more than 2.5 weight %. Preferably the content is between 0.01-2.5 weight %, more preferably 0.02-2.5 weight %, and still more preferably 0.02-1.5 weight %. To exhibit a moisture content within 0.01-2.5 weight % it is effective to have an acid value of a polymerizing monomer to be less than 10 (KOH), preferably less than 2, and more preferably less than 1. Not only the selection of the material, but also added may be a method to shield ink from the ambient air. However, physical dehydration treatment is generally preferred in the final stage of ink preparation, such as a heating treatment, a dewatering treatment and a pressure reduction treatment. Specifically, dehydration by reduced pressure is more preferable due to effectiveness without adding excessive heat to the ink. It is preferable that the ink supply system is airtight to prevent ink contact with the ambient air after ink preparation, from the view point of repeatedly obtaining the desired effects of this invention. Controlling the moisture content or the acid value as mentioned above provides outstanding effects in improved sensitivity, ink storage stability and ejection properties of not only radical polymerization, but also cationic polymerization.

Base Material

Usable base materials in this invention are, for example, common paper for printing such as bond paper, coated paper; polyethylene terephthalate (PET); oriented polystyrene (OPS); oriented nylon (ONy); oriented polypropylene (OPP); polyvinyl chloride (PVC); various polyolefin film; acrylic resin; polycarbonate; phenol resin; glass; and metals.

It is preferred to provide a means to adjust the surface energy of the base material surface before ink ejection, such as a flame treatment, a corona treatment, a plasma treatment, and a liquid treatment. By providing the foregoing treatment, preferably uniform dot diameter of the ink is obtained, resulting in having higher image quality along with improved adhesion to the base material. Of these, plasma treatment is extremely effective due to not generating ozone.

Forming Method of Ink-Jet Images

Ink-jet heads for ink ejection in this invention include various types, such as a continuous type, a piezo type, and a thermal type. A piezo type is specifically preferable due to its capability of response to a wide range of aqueous physical properties, and no burn-dry or polymerization of the ink by heat. For example, the compositions described in European Patent A-0277703 and 0278590 may be employed.

In the image forming methods of this invention, ink is ejected, and then actinic radiation is irradiated within 1 ms right after ink contact by illuminance of 5-2,000 mW/m$^2$. To make radiation time less than 1 ms, the distance between the head and the light source is too short in practice, resulting in occurrence of problems such as undesired energy radiation to the head. Further, a radiation time of more than 1,000 ms may deteriorate image quality with ink bleeding in multi colors. Low illuminance of less than 5 mW/m2 may cause problems of bleeding by polymerization inhibition by oxygen or retardation of ink curing. On the other hand, illuminance of more than 2,000 mW/m2 is not preferable due to deformation of the base material by heat of the light source, high cost of the light source, large size of the light source, and problems caused by the apparatus size and enhancement of a recording rate.

Any ultraviolet light source may be employed as a radiation light source, such as, a high or low pressure mercury lamp, a cold cathode tube, a black light, an ultraviolet LED, an ultraviolet laser, and a flash light. Of these, the preferred source is one exhibiting a relatively long wavelength as an ultraviolet element and a dominant wavelength of UV rays of 300-400 nm. Specifically, an UV-A light source is preferable to obtain interior curability due to hardly ever causing a light scattering effect. Further, it is possible to cure using two light sources of differing wavelength or illuminance.

EXAMPLES

The present invention will be further explained based on examples on the following paragraphs, but it is not limited to these examples.

Example 1

Preparation of Colorant Dispersion

Each component described below was blended in a pressure kneader adjusting viscosity of more than 10$^6$ mPa·s. Subsequently, each of the colorant dispersion was prepared by milling and dispersion with a double roller mill. The temperature was controlled not to exceed 80° C. in these processes. The "parts" for each component indicates "parts by weight".

Preparation of Black Colorant dispersion 1

| | |
|---|---|
| Pigment Black 7 (Carbon black) | 70 parts |
| Styrene acrylate ester copolymer (Acid value < 1) | 10 parts |
| Phenoxypolyethylene glycol acrylate | 20 parts |
| Polymerization inhibitor (Sumilizer GS, produced by Sumitomo Chemical Co., Ltd.) | 0.1 parts |

Preparation of Yellow Colorant dispersion 1

| | |
|---|---|
| Pigment Yellow 93 | 70 parts |
| Nonion type dispersing agent | 10 parts |
| Phenoxypolyethylene glycol acrylate | 20 parts |
| Polymerization inhibitor (Sumilizer GS, produced by Sumitomo Chemical Co., Ltd.) | 0.1 parts |

Preparation of Magenta Colorant dispersion 1

| | |
|---|---|
| Pigment Violet 19 | 70 parts |
| Nonion type dispersing agent | 10 parts |
| Phenoxypolyethylene glycol acrylate | 20 parts |
| Polymerization inhibitor (Sumilizer GS, produced by Sumitomo Chemical Co., Ltd.) | 0.1 parts |

Preparation of Cyan Colorant dispersion 1

| | |
|---|---|
| Pigment Blue 15: 3 | 70 parts |
| Nonion type dispersing agent | 10 parts |
| Phenoxypolyethylene glycol acrylate | 20 parts |
| Polymerization inhibitor (Sumilizer GS, produced by Sumitomo Chemical Co., Ltd.) | 0.1 parts |

Preparation of White Colorant dispersion 1

| | |
|---|---|
| Pigment White (Titanium oxide) | 85 parts |
| Nonion type dispersing agent | 10 parts |
| Phenoxypolyethylene glycol acrylate | 10 parts |
| Polymerization inhibitor (Sumilizer GS, produced by Sumitomo Chemical Co., Ltd.) | 0.1 parts |

Preparation of Ink

Each of these color inks was prepared using each of the foregoing prepared colorant dispersion based on the compositions described in Table 1.

In each of the color inks, all additives except colorant dispersion were blended, which successively raised the temperature of the solution to 50° C. after the additives were sufficiently dissolved. Each of the foregoing colorant dispersions was gradually added to the solution, and after sufficient stirring using a dissolver, filtration was performed with a 0.8 μm filter. As a pre-treatment, pre-filtration with 10 μm filter was performed. Generation of a pressure loss was quite small, and an adequate filtration rate was obtained.

Subsequently, the ink was heated to 50° C., and each of the inks was prepared by elimination of dissolved air and moisture under decreased pressure while stirring. The viscosity of each ink was in the range of 12-22 mPa·s at 25° C., at a surface tension of 24-30 dyn/cm, and an average size of pigment particles of 0.08-0.30 μm, at a moisture content in the range of 0.7-1.2%.

TABLE 1

| Name of the ink | Colorant dispersion | | Additive (%) | | | |
|---|---|---|---|---|---|---|
| | Kind | Content (%) | DPCA60 | TEGDA | PO-A | I369 |
| Black ink | Black colorant dispersion 1 | 4 | 25 | 25 | 41 | 5 |
| Yellow ink | Yellow colorant dispersion 1 | 4 | 25 | 25 | 41 | 5 |
| Magenta ink | Magenta colorant dispersion 1 | 4 | 25 | 25 | 41 | 5 |
| Cyan ink | Cyan colorant dispersion 1 | 3 | 25 | 25 | 42 | 5 |
| White ink | White colorant dispersion 1 | 7 | 25 | 25 | 38 | 5 |

The details of each additive described in Table 1 are as follows.

DPCA60: KAYARAD DPCA, produced by Nippon Kayaku Co., Ltd. (caplolactam modified dipentaerythritol hexaacrylate)

TEGDA: Biscoat #335HP, produced by Osaka Organic Chemical Industry Ltd. (tetraethylene glycol diacrylate)

PO-A: Light acrylate PO-A, produced by Kyoeisha Chemical Co., Ltd. (phenoxyethyle acrulate)

I369: Irugacure 369, produced by Ciba Specialty Chemicals (2-benzyl-2-dimethylamino-1-(4-morpholinophenyl)-butanon-1)

Ink-Jet Image Output

Next, recording was conducted onto a recording medium using an ink-jet recording device which had a nozzle diameter of 23 μm, and a piezo type ink-jet head with 128 nozzles.

The used ink supply system comprised an ink tank, a supply pipe, an anterior ink tank just prior to the head, piping with a filter, and a piezo head. Temperature sensors were provided in an anterior tank and around nozzles of the piezo head, while temperature control was effected to maintain the nozzle area always at 60±2° C. Individual ink drop size was regulated to about 7 μl, and the device was driven at a frequency of 10 KHz, to eject by resolving power of 720×720 dpi [herein, dpi means a dot number per inch (2.54 cm)]. Images were recorded with cyan text images on a solid image of magenta for evaluation.

Evaluation was conducted using a full-5 color printer of loaded 5 color heads of Y, M, C, K and W on a head carriage. Low pressure mercury lamps radiating UV-A rays were provided on both sides of the carriage, and thus, UV rays could be irradiated within 1,000 ms after ink contacting by scanning the head.

The illuminance of exposure surface was regulated to be 1,000 mW/cm$^2$. Exposure energy was controlled by speed change of the head carriage, and the accumulated amount of light irradiated to the total ink was adjustable in the range of 50-600 mJ/cm$^2$. The point that surface tackiness disappeared was referred to as sensitivity. The determined sensitivity of each color ink in the above manner was 100-170 mJ/cm$^2$.

OPS was employed as a base material after a plasma treatment on the surface to be 46 dyn/cm of wetting index.

Evaluation of Continuous Ejection Property

Continuous ejection of 30 min. under the foregoing conditions resulted in no clogging in any nozzle, resulting in stable ejection. Further, in comparison of the start and finish of ejection, the ink dot diameter formed on the base material surface was uniform, and dot deformation by satellite was rarely observed. Even when a heat cycle was repeated in the range of room temperature to 60° C., nozzle clogging was not observed and stable ejection was confirmed.

Further, each of the inks was stored at 80° C. for 24 hrs with light shielding and tightly sealed conditions, no denaturation of ink was observed, and confirmed ink storage stability as being good.

Example 2

Preparation of Magenta Colorant Dispersion

Magenta colorant dispersions 2 through 6 were prepared in the same manner as Magenta colorant dispersion 1 in Example 1 except that the added amount of the magenta pigment (Pigment Violet 19), the kinds and added amounts of dispersion mediums, with or without addition of a nonion surface active agents, and with or without addition of the polymerization inhibitor (Sumilizer GS) were changed as described in Table 2.

TABLE 2

| No. of Magenta Colorant dispersion | Content of Pigment (%) | Dispersion Medium Kind | Dispersion Medium Content (%) | Dispersing Agent (%) | SumilizerGS (%) |
|---|---|---|---|---|---|
| 2 | 70 | PO-A | 20 | 10 | — |
| 3 | 70 | DPCA60 | 20 | 10 | 0.1 |
| 4 | 50 | SMA | 50 | — | — |
| 5 | 50 | Butyral Resin | 50 | — | — |
| 6 | 20 | Butyral Resin | 70 | — | — |

The details of the dispersion mediums were as follows:
SMA: styrene.acrylate.acrylic acid copolymer (at an acid value of 200)
Butyral Resin: moderately butyralized polyvinyl alcohol Preparation of Magenta Ink Using Magenta colorant dispersions 2 through 6 prepared as above, Magenta Inks 2 through 8 were prepared by the combination with additives described in Table 3, based on the ink preparation method described in Example 1. Only Magenta Ink 8 only was not subjected to a reduced pressure treatment, resulting in a moisture content of ink of 2.6 weight %.

In the foregoing preparation of each magenta ink, Magenta colorant dispersion 2 generated a gelled compound during milling and dispersion, after which the gelled compound was removed with a mesh to obtain ink. Magenta colorant dispersion also slightly generated a gelled compound.

In Table 3, the details of additives other than those described in Example 1 were as follows:
I184: Irgacure 184, produced by Ciba Specialty Chemicals.

Ink-Jet Image Output

The output of ink-jet images was conducted using Magenta inks 2 through 8 prepared above and Magenta ink 1 prepared in Example 1, in the same manner as described in Example 1, and measurement of sensitivity, ink viscosity and evaluation of continuous ink ejection property, heat cycle ability and ink storage stability were performed based on the following methods.

Measurement of Sensitivity

The illuminance of exposed surfaces was determined to be 1,000 mW/cm$^2$. Exposure energy was controlled by speed change of the head carriage, and the accumulated amount of light irradiated onto the total ink was adjusted to be in the range of 50-600 mJ/cm$^2$. The point that at which surface tackiness disappeared was referred to as sensitivity.

Evaluation of Continuous Ink Ejection Property

Continuous ink ejection property after 30 min. of continuous ejection was evaluated by noting nozzle clogging based on the following criteria.
A: Nozzle clogging was not observed.
B: Nozzle clogging was not observed, but satellite was observed.
C: Nozzle clogging was observed.

Evaluation of Heat Cycle Ability

To evaluate nozzle clogging after ink ejection, each of the magenta inks prepared as above was subjected 10 times to a heat cycle in the range of room temperature to 60° C., and then heat cycle ability was evaluated based on the following criteria.
A: No nozzle clogging was observed after 10 heat recycles.
B: No nozzle clogging was observed, but partial satellite was observed after 10 heat recycles.
C: Definite nozzle clogging was observed after 10 heat recycles.

Evaluation of Ink Storage Stability

Each magenta ink prepared as above was sealed in a glass bottle, which was stored in an 80° C. chamber for 24 hrs., and ink storage stability was evaluated by visual observation of the ink characteristics, based on the following criteria.

TABLE 3

| No. of Magenta Ink | Magenta Colorant dispersion No. | Magenta Colorant dispersion added amount (%) | Reduced Pressure Dehydration | Additive (%) DPCA60 | TEGDA | PO-A | I369 | I184 |
|---|---|---|---|---|---|---|---|---|
| 2 | 2 | 4 | Yes | 25 | 25 | 41 | 5 | — |
| 3 | 3 | 4 | Yes | 25 | 25 | 41 | 5 | — |
| 4 | 4 | 5 | Yes | 25 | 25 | 40 | 5 | — |
| 5 | 4 | 5 | Yes | 25 | 25 | 40 | — | 5 |
| 6 | 5 | 5 | Yes | 25 | 25 | 40 | 5 | — |
| 7 | 6 | 10 | Yes | 25 | 25 | 30 | 5 | — |
| 8 | 4 | 5 | No | 25 | 25 | 41 | 5 | — |

A: No change was observed in the ink.
B: A viscosity increase of more than 20% was observed.
C: Gelling of the ink was observed.

Measurement of Ink Viscosity

Viscosity of each magenta ink prepared as above at 25° C. was measured using an oscillating viscosity meter.

A: Less than 20 mPa·s.
AB: More than 20 mPa·s but less than 80 mPa·s
B: More than 80 mPa·s but less than 500 mPa·s
C: More than 500 mPa·s The results are shown in Table 4.

TABLE 4

| Magenta Ink No. | Sensitivity | Continuous Ink Ejection Property | Heat Cycle Ability | Storage Stability | Viscosity | Remarks |
| --- | --- | --- | --- | --- | --- | --- |
| 1 | 120 | A | A | A | A | Inv. |
| 2 | 120 | B | B | B | A | Inv. |
| 3 | 120 | A | B | B | A | Inv. |
| 4 | 120 | A | B | B | B | Inv. |
| 5 | 240 | A | A | A | B | Inv. |
| 6 | 110 | A | A | A | B | Inv. |
| 7 | 110 | C | C | B | C | Comp. |
| 8 | 140 | C | C | C | C | Comp. |

Inv.; Inventive sample
Comp.; Comparative sample

As is apparent from Table 4, it was proved that the ink comprised of the compositions of the present invention exhibited higher sensitivity, better continuous ink ejecting property, better heat cycle ability, better ink storage stability and less viscosity variation compared to the comparative examples.

The present invention provides an actinic radiation curable ink exhibiting low viscosity, and superiority of sensitivity, ink ejection stability, heat cycle ability and ink storage stability, and details its preparation method and image forming method using the same.

The invention claimed is:

1. A method for producing a radiation-curable ink, comprising the steps of:
    (a) adding a pigment to a diluent, the diluent comprising at least one component selected from the group consisting of a resin, a dispersant and a first polymerizable compound, in a vessel to obtain a pigment mixture, a weight ratio of the pigment being 20 to 95 weight % based on the total weight of the pigment mixture;
    (b) dispersing the pigment mixture to obtain a colorant dispersion;
    (c) adding a second polymerizable compound and a polymerization initiator to the colorant dispersion to obtain a radiation-curable ink precursor, provided that the first polymerizable compound and the second polymerizable compound may be the same or different than each other;
    (d) adjusting a content of water in the radiation-curable ink precursor to be not more than 2.5% weight % based on the total weight of the radiation-curable ink precursor; and
    (e) dispersing the radiation-curable ink precursor to obtain a radiation-curable ink having a viscosity of 6 to 500 mPa·s measured at 25° C.

2. The method of claim 1, wherein the diluent comprises a polymerizable monomer or a polymerizable oligomer.

3. The method of claim 1, wherein a polymerization inhibitor is further added in the step (a).

4. The method of claim 3, wherein the polymerization inhibitor is a phenol derivative comprising a carbon-carbon double bond derived from an acrylic acid.

5. The method of claim 1, wherein the step (d) is carried out by applying heat to the radiation-curable ink precursor or by subjecting the radiation-curable ink precursor under a reduced pressure so as to reduce water.

6. The method of claim 1, wherein in step (d), the content of water is adjusted to an amount of not more than 1.5 weight % based on the total weight of the radiation-curable ink measured with Karl Fisher method.

7. The method of claim 1, wherein an acid value of each of the diluent, the second polymerizable compound and the polymerization initiator is at most 10.

* * * * *

UNITED STATES PATENT AND TRADEMARK OFFICE
CERTIFICATE OF CORRECTION

PATENT NO. : 7,615,583 B2  Page 1 of 1
APPLICATION NO. : 11/371786
DATED : November 10, 2009
INVENTOR(S) : Atsushi Nakajima It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Nineteenth Day of October, 2010

David J. Kappos
*Director of the United States Patent and Trademark Office*